United States Patent [19]

Goff

[11] Patent Number: 5,298,544
[45] Date of Patent: Mar. 29, 1994

[54] NON-HALOGEN FLAME RETARDANT THERMOPLASTIC COMPOSITION

[75] Inventor: Leslie J. Goff, Evansville, Ind.

[73] Assignee: General Electric Company, Pittsfield, Mass.

[21] Appl. No.: 102,606

[22] Filed: Aug. 5, 1993

[51] Int. Cl.$^5$ ............................ C08K 3/38; C08K 3/26
[52] U.S. Cl. .................................. 524/405; 524/424; 524/425; 524/432
[58] Field of Search ................ 524/424, 425, 405, 432

[56] References Cited

U.S. PATENT DOCUMENTS

| | | | |
|---|---|---|---|
| 4,394,471 | 7/1983 | Keogh | 524/424 |
| 4,713,407 | 12/1987 | Bailey et al. | 524/405 |
| 4,722,858 | 2/1988 | Harbourne et al. | 524/405 |
| 4,826,899 | 5/1989 | Rees | 524/424 |
| 4,833,190 | 5/1989 | Cella et al. | 524/405 |
| 4,847,317 | 7/1989 | Dokurno et al. | 524/425 |
| 4,891,397 | 1/1990 | Liu | 524/424 |
| 5,032,639 | 7/1991 | Buchert et al. | 524/405 |
| 5,049,597 | 9/1991 | Howard | 524/424 |
| 5,055,513 | 10/1991 | Banford et al. | 524/424 |
| 5,057,367 | 10/1991 | Morii et al. | 524/424 |

FOREIGN PATENT DOCUMENTS 230564 8/1987 European Pat. Off. .

Primary Examiner—Veronica P. Hoke

[57] ABSTRACT

This invention is directed to a flame retarded thermoplastic molding composition consisting essentially of a thermoplastic resin and a flame retardant. The thermoplastic resin is a copolyetherimide ester or a copolyether ester or a blend thereof. The flame retardant is magnesium carbonate or a blend of magnesium carbonate and calcium carbonate having in combination therewith zinc borate or zinc oxide or a blend of zinc borate and zinc oxide.

7 Claims, No Drawings

NON-HALOGEN FLAME RETARDANT THERMOPLASTIC COMPOSITION

FIELD OF THE INVENTION

This invention is directed to a non-brominated flame retardant thermoplastic composition and more particularly to the use of certain magnesium compounds in combination with another component as flame retardants for copolyetherimide esters and copolyether esters. The magnesium compound is magnesium carbonate or blends thereof with calcium carbonate and the other component is zinc borate or zinc oxide or mixture thereof.

BACKGROUND OF THE INVENTION

Copolyetherimide esters and copolyether esters are well known in art and have been referred to as elastomers. However, in certain applications, it is necessary that such esters be rendered flame retardant where fire can result from the burning of the thermoplastic resin and which can then further contribute to the burning of other combustibles in the immediate area. While halogens, particularly bromine containing compounds, have found usefulness in thermoplastic resins as flame retardant additives, there is, however, the need to move away from such halogen compounds and into non-halogen flame retardants because of the impact halogens have on the environment. However, obtaining successful non-halogen flame retardants with copolyetherimide esters or copolyether esters is not obvious because of the complex nature of the thermoplastic resins of this invention.

Japanese patent publication JP62161850 discloses a vinyl chloride graft polymer such as ethylene vinyl acetate flame retarded with calcium carbonate and magnesium hydroxide with clay and silica.

European patent disclosure EP230564 discloses a flame retarded rubber flooring composition, containing in combination aluminum hydroxide and either calcium carbonate, magnesium hydroxide or magnesium oxide in combination with zinc borate, antimony trioxide or antimony pentoxide.

It has now been discovered that flame retarded polymers of the type disclosed above, namely copolyetherimide esters and copolyether esters, can be obtained employing a particular non-halogen flame retardant. It is surprising that certain hydrated minerals provide a flame retardant composition of this invention that can be molded into a finished article. Other mineral flame retardants have been tried but the resulting composition cannot be injection molded. The mineral flame retardants of this invention have a higher decomposition temperature than other non-mineral flame retardants. However, it has been surprisingly discovered that only certain hydrated minerals are capable of producing the flame retarded moldable thermoplastic compositions of this invention.

DESCRIPTION OF THE INVENTION

According to this invention, there is provided a flame retarded thermoplastic resin composition consisting essentially of in combination
(1) a thermoplastic resin, and
(2) a flame retarding amount of a non-halogen flame retardant consisting of magnesium carbonate or a blend thereof with calcium carbonate and having in combination therewith zinc borate, zinc oxide or blends of zinc borate and zinc oxide.

The thermoplastic resin used in the practice of this invention consists essentially of either a copolyetherimide ester, a copolyether ester or a combination of the two esters.

The copolyetherimide esters of this invention consist of a multiplicity of recurring long chain ester units and short chain ester units that can be joined through imido-ester linkages. The hard segments of these elastomers consist essentially of multiple short chain ester units represented by the formula

wherein R is a divalent radical remaining after removal of carboxyl groups from an aromatic dicarboxylic acid having a molecular weight less than about 300, and D is a divalent radical remaining after removal of hydroxyl groups from a diol having a molecular weight less than about 250; provided said short chain ester units amount to about 20–85 percent by weight of said copolyetherimide ester.

The soft segments of these polymers are derived from poly(oxyalkylene dimide) diacid which can be characterized by the following formula

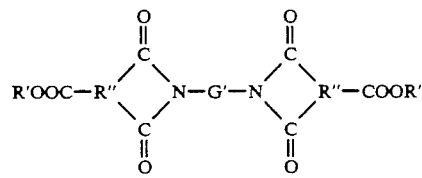

Wherein, each R" is independently a trivalent organic radical, preferably a $C_2$ to $C_{20}$ aliphatic, aromatic or cycloaliphatic trivalent organic radical; each R' is independently hydrogen or a monovalent organic radical preferably selected from the group consisting of $C_1$ to $C_6$ aliphatic and cycloaliphatic radicals and $C_6$ to $C_{12}$ aromatic radicals, e.g., benzyl, much preferably hydrogen; and G' is the radical remaining after the removal of the terminal (or as nearly terminal as possible) amino groups of a long chain ether diamine having an average molecular weight of from about 600 to about 12,000, preferable from about 900 to about 4,000, and a carbon-to-oxygen ratio of from 1.8 to about 4.3.

These long chain ether gylcols from which the polyoxyalkylene diamine is prepared include poly (ethylene ether) gylcol; poly(propylene ether) gylcol; poly(tetramethylene ether) gylcol; random or blocked copolymers of ethylene oxide and propylene oxide, including propylene oxide terminated poly(ethylene ether) gylcol; and random or blocked copolymers of tetrahydrofuran with minor amounts of a second monomer such as methyl tetrahydrofuran. Especially preferred poly(alkylene ether) gylcols are poly(propylene ether) gylcol and poly(ethylene ether) gylcol end capped with poly(propylene ether) gylcol and/or propylene oxide.

The tricarboxylic component is a carboxylic acid anhydride containing an additional carboxylic group or the corresponding acid thereof containing two immide forming vicinal carboxyl groups in lieu of the anhydride group. Mixtures thereof are also suitable. The additional carboxylic group must be esterified and preferably and substantially nonimidizable.

Further, while trimellitic anhydride is preferred as the tricarboxylic component, any of a number of suitable tricarboxylic acid constituents will occur to those skilled in the art.

Generally, the copolyetherimide esters comprise the reaction product of dimethylterephthalate, preferably with up to about 40 mole percent of another dicarboxylic acid; 1, 4-butanediol, generally with up to about 40 mole percent of another saturated or unsaturated aliphatic and/or cycloaliphatic diol, and a polyoxyalkylene diamide diacid prepared from a polyoxyalkalene diamine of molecular weight, about 600 to about 12,000, preferable from about 900 to about 4,000, and trimellitic anhydride. Also in place of the 1, 4-butanediol, 1, 4-butenediol or a mixture of 1, 4-butanediol and 1, 4-butenediol can be employed therein as disclosed in U.S. Pat. No. 4,520,149.

The polyetherimide esters described herein and the procedures for their prepartion are more fully described in U.S. Pat. Nos. 3,123,192, 3,763,109; 3,651,014; 3,663,655; 3,801,547 and 4,556,705 incorporated herein by reference.

The other thermoplastic resin that may be employed in the practices of this invention are the copolyether esters which also consist of a multiplicity of recurring long chain ester units and short chain ester units, joined head-to-tail through ester linkages. The long chain ester units are represented by the formula

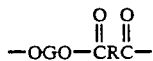   (III)

and the said short chain ester units are represented by the formula

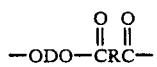   (IV)

wherein G is a divalent radical remaining after the removal of terminal hydroxyl groups from a poly(alkyleneoxide) glycol having a number averager molecular weight of about 400 to about 6,000 and a carbon to oxygen atomic ratio of about 2.0-4.3; R is a divalent radical remaining after removal of carboxyl groups from an aromatic dicarboyxlic acid having a molecular weight of less than about 300 and D is a divalent radical remaining after removal of hydroxyl groups from a diol having a molecular weight less than about 250; provided said short chain ester units amount to about 25-70 percent by weight of said copolyetherester.

The term "long-chain ester units" as applied to units in a polymer chain of the copolyether ester refers to the reaction product of a long-chain glycol with a dicarboxylic acid. Such "long-chain ester units", which are a repeating unit in the copolyether esters, correspond to formula (III) above. The long-chain glycols are polymeric glycols having terminal (or as nearly terminal as possible) hydroxy groups and a molecular weight from about 400-6000. The long-chain glycols used to prepare the copolyether esters are poly(alkylene oxide) glycols having a carbon-to-oxygen atomic ratio of about 2.0-4.3. Representative long-chain glycols are poly-(ethylene oxide) glycol, poly(1,2- and 1,3-propylene oxide) glycol, poly(tetramethylene oxide) glycol, random or block copolymers or ethylene oxide and 1,2 propylene oxide, and random or block copolymers of tetrahydrofuran with minor amounts of a second monomer such as ethylene oxide. The term "short-chain ester units" as applied to units in a polymer chain of the copolyether ester refers to low molecular weight chain units. They are made by reacting a low molecular weight diol (below about 250) with an aromatic dicarboxylic acid having a molecular weight below about 300, to form ester units represented by formula (IV) above wherein D and R have the same meaning as in formula (I).

The term "low molecular weight diols" as used herein should be construed to include equivalent ester-forming derivatives, provided, however, that the molecular weight requirement pertains to the diol only and not to its derivatives.

Preferred are diols with 2-15 carbon atoms such as ethylene, propylene, tetramethylene, pentamethylene, 2,2-dimethyltrimethylene, hexamethylene, and decamethylene glycols, dihydroxycyclohexane, cyclohexane dimethanol, and the unsaturated 1,4-butanediol or 1,4-butenediol or mixtures thereof.

The term "dicarboxylic acids" as used herein, includes equivalents of dicarboxylic acids having two functional groups which perform substantially like dicarboxylic acids in reaction with glycols and diols in forming copolyether ester polymers. These equivalents include esters and ester-forming derivatives, such as acid anhydrides. The molecular weight requirement pertains to the acid and not to its equivalent ester or esterforming derivative.

Among the aromatic dicarboxylic acids for preparing the copolyether ester polymers, those with 8-16 carbon atoms are preferred, particularly the phenylene dicarboxylic acids, i.e., phthalic, terephthalic and isophthalic acids and their dimenthyl esters.

The short-chain ester units will constitute about 20-85 weight percent of the copolyether ester. The remainder of the copolyether ester will be longchain ester units comprising about 15-80 weight percent of the copolyether ester.

Preferred copolyether esters are those prepared from dimethyl terephthalate, 1,4-butanediol, and poly(tetramethylene oxide) glycol having a molecular weight of about 600-2000. Optionally, up to about 30 mole percent of the dimethyl terephthalate in these polymers can be replaced by dimethyl phthalate or dimethyl isophthalate. Polymers in which a portion of the butanediol is replaced by butenediol are also preferred.

The dicarboxylic acids or their derivatives and the polymeric glycol are incorporated into the copolyether ester in the same molar proportions as are present in the reaction mixture. The amount of low molecular weight diol actually incorporated corresponds to the difference between the moles of diacid and polymeric glycol present in the reaction mixture. When mixtures of low molecular weight diols are employed, the amounts of each diol incorporated depends on their molar concentration, boiling points and relative reactivities. The total amount of diol incorporated is still the difference between moles of diacid and polymeric glycol.

The copolyether esters described herein are made by a conventional ester interchange reaction which, preferably, takes place in the presence of a phenolic antioxidant that is stable and substantially nonvolatile during the polymerization.

A preferred procedure involves heating the dimethyl ester of terephthalic acid with a long-chain glycol and 1,4-butanediol in a molar excess and a phenolic antioxidant and hindered amine photostabilizer in effective concentrations in the presence of a catalyst at about 150°-260° C. and a pressure of 0.05 to 0.5 Mpa, preferably ambient pressure, while distilling off methanol formed by the ester interchange. Depending on temperature, catalyst, glycol excess and equipment, this reaction can be completed within a few minutes, e.g., about two minutes, to a few hours, e.g., about two hours. This procedure results in the preparation of a low molecular weight prepolymer which can be carried to a high molecular weight copolyether ester by distillation of the excess of short-chain diol. The second process stage is known as "polycondensation".

Additional ester interchange occurs during this polycondensation which serves to increase the molecular weight and to randomize the arrangement of the copolyether ester units. Best results are usually obtained if this final distillation or polycondensation is run at less than about 670 Pa, preferably less than about 250 Pa, and about 200°-280° C., preferably about 220°-260° C., for less than about two hours, e.g., about 0.5 to 1.5 hours. A phenolic antioxidant can be introduced at any state of copolyether ester formation or after the polymer is prepared. As indicated above, preferably, a phenolic antioxidant is added with the monomers. It is customary to employ a catalyst while carrying out ester interchange reactions. While a wide variety of catalysts can be employed, organic titanates such as tetrabutyl titanate used alone or in combination with magnesium or calcium accetates are preferred. The catalyst should be present in the amount of about 0.0005 to 2.0 percent by weight based on total reactants.

Both batch and continuous methods can be used for any state of copolyether ester polymer preparation. Polycondensation of prepolymer already containing the phenolic antioxidant and hindered amine photostabilizer can also be accomplished in the solid phase by heating divided solid prepolymer in a vacuum or in a stream of inert gases to remove liberated low molecular weight diol. This method has the advantage of reducing thermal degradation because it must be used at temperatures below the softening point of the prepolymer.

A more detailed description of suitable copolyether esters and procedures for their preparation are further described in U.S. Pat. Nos. 3,023,192; 3,651,014; 3,763,109; 3,766,146; and 4,355,155, which are incorporated herein by reference.

The amounts of flame retardant additive used in the present invention is not critical providing that the amount employed is sufficient to reduce the flammability of the thermoplastic resin and will not significantly detract from the physical properties of the thermoplastic resin. Also, the amount of flame retardant employed herein must not affect the moldability of the thermoplastic resin. While those skilled in the art are well aware of the amount necessary to impart reduction in flammability of the thermoplastic resin, in general, the amount of flame retardant will vary from about 30 to 80 parts by weight based on the total weight of the flame retarded thermoplastic composition.

The flame retardant additive employed in this invention is selected from the group consisting essentially of magnesium carbonate and a blend of magnesium carbonate and calcium carbonate and having in combination therewith a further additive selected from the group consisting essentially of zinc borate, zinc oxide and blends of zinc borate and zinc oxide.

Again, the amount of the combination of the carbonates of this invention and the zinc borate and/or zinc oxide is that amount sufficient to reduce the flammability of the thermoplastic resin of the invention. In general, the flame retardant consist essentially of about 75 to 90 parts by weight of the carbonates and about 25 to 10 parts by weight of the zinc borate and/or zinc oxide.

In the combination of magnesium carbonate and calcium carbonate, the magnesium carbonate consists of at least about 30 parts by weight of the combination. In the combination of zinc borate and zinc oxide, the zinc borate consists of at least 50 parts by weight of combination.

DESCRIPTION OF THE PREPARED EMBODIMENT

The following examples are set forth to illustrate the instant invention and are not to be construed as limiting the scope of the invention thereto. Unless otherwise indicated, all parts and percentages are on a weight basis.

EXAMPLE 1

In a mechanical laboratory shaker, 48.6 parts by weight of a copolyetherimide ester (General Electric Company LOMOD® J10 resin) having a melt viscosity range of 1200-2000 poise at 250° C. and 2.15 Kg loading, and 50 parts by weight of magnesium carbonate were mixed with 1.4 parts by weight of a stabilizer package consisting of sodium sterate, Irganox 1010, sodium sterate, tris (nonyl phenyl) phosphite and polytetrafluroethylene (Teflon) concentrate. The mixture was then fed to a single screw laboratory extruder. The extrudate strand was fed into a water bath and then pelletized. The temperature of the extruder was at about 400° F. flat profile in that the temperature was essentially constant across the barrel of the extruder. The die orifice through which the mixture was extruded was also at about 400° F.

The pellets were dried at about 120° C. for about two hours and were then injection molded into test specimens of ⅛" by ⅛" by 2½ type L bars. The injection molding machine used was an 80 ton Van Dorn, and the temperature of the barrel was at about 420° F. at essentially a flat temperature profile with a mold temperature of about 100° F. The melt viscosity index at 250° C. (MVI) of the resin and property profile was also determined as shown below in Table 1.

The test specimens were then evaluated for flame resistance using the Underwaters Laboratory Test Procedure Bulletin 94 (UL 94) and the results were as shown below in Table 1.

EXAMPLE 2

Example 1 was repeated, except that the formulation consisted of 45.6 parts by weight of a copolyether ester (General Electric Company LOMOD® B20 resin) having a melt viscosity of about 1500-2000 poise at 250° C. and 2.16 Kg loading, 50 parts by weight of magnesium carbonate, 5 parts by weight of zinc borate, and 1 part by weight of stabilizers.

The results obtained were as shown in Table 1 below.

EXAMPLE 3

Example 1 was repeated, except that in place of the magnesium carbonate, magnesium hydroxide was employed (Magnifins). The results were as shown in Table 1 below.

TABLE 1

| | Example | | |
|---|---|---|---|
| | 1 | 2 | 3 |
| UL Bul 94 at 1/8" bar | V2 | V1 | Test bars could not be molded |
| MVI (4 min. g/10 min.) | 1995 | 6340 | 560 |
| MVI (8 min. g/10 min.) | 1030 | 4075 | No flow |
| MVI (12 min. g/10 min.) | 614 | 2625 | No flow |
| Tensile elongation (%) ASTM D638 | 24 | 26 | |
| Tensile strength (psi $\times$ $10^{-3}$) ASTM D638 | 2.7 | 3.0 | |
| Flexural strength (psi $\times$ $10^{-3}$) ASTM D790 | 3.3 | 3.5 | |
| Flexural modulus (psi $\times$ $10^{-3}$) ASTM D790 | 70 | 89 | |

EXAMPLE 4

Example 3 was repeated, except that magnesium hydroxide with various surface treatments were tested. The magnesium hydroxides used consisted of silane treated, sterric acid treated and proprietary coated magnesium hydroxides (Zerogen 30A). None of the magnesium hydroxides of this Example 4. were extrudeable and they could not be molded in order to test the sample for flammability properties.

EXAMPLE 5

Example 1 was repeated, except that in place of the magnesium carbonate, calcium carbonate and aluminum hydroxide were used. Using both additives separately, a product or article could not be formed. The material as it came out of the extruder foamed, and thus the formulations could not be injection molded into test specimens for flame retardancy.

EXAMPLE 6

Example 2 was repeated, except that in place of the magnesium carbonate employed therein, a blend of magnesium carbonate and calcium carbonate was used. The material is sold under the trademark Ultracarb by Anzon, Inc. The results obtained were essentially the same results as shown in Example 2.

While other modifications and variations of the present invention are possible in light of the above teaching, it is therefore understood that changes may be made in the particular embodiments described herein without deviating from the scope of the invention as defined in the claims.

What is claimed is:

1. A non-halogen thermoplastic flame retarded molding composition consisting essentially of a thermoplastic resin selected from the group consisting of copolyetherimide esters and copolyether esters and mixtures thereof and an effective amount of a non-halogen flame retardant selected from the group consisting of magnesium carbonate and mixtures of magnesium carbonate and calcium carbonate in combination with a material selected from the group consisting of zinc borate, zinc oxide and mixtures thereof.

2. The composition of claim 1 wherein the flame retardant composition consists essentially of 20 to 60 parts by weight of the thermoplastic resin and 80 to 40 parts by weight of the flame retardant based upon the weight of the molding composition.

3. The composition of claim 1 wherein the flame retardant consists essentially of 75 to 99 parts by weight of magnesium carbonate and correspondingly 25 to 1 parts by weight of zinc borate based on the weight of the flame retardant.

4. The thermoplastic flame retarded composition of claim 1 wherein the thermoplastic resin is a copolyetherimide ester.

5. The thermoplastic flame retarded composition of claim 1 wherein the thermoplastic resin is a copolyether ester.

6. The composition of claim 4 wherein the flame retardant is in combination 75 to 99 parts by weight of magnesium carbonate and 25 to 1 parts by weight of zinc borate based on the weight of the flame retardant.

7. The composition of claim 5 wherein the flame retardant is in combination 75 to 99 parts by weight of magnesium carbonate and 25 to 1 parts by weight of zinc borate based on the weight of the flame retardant.

* * * * *